United States Patent [19]

Zievers et al.

[11] Patent Number: 4,664,752
[45] Date of Patent: May 12, 1987

[54] DESALINATION SYSTEM

[75] Inventors: James F. Zievers, LaGrange; Paul Eggerstedt, Lyons, both of Ill.

[73] Assignee: Industrial Filter & Pump Mfg. Co., Cicero, Ill.

[21] Appl. No.: 444,630

[22] Filed: Nov. 26, 1982

[51] Int. Cl.[4] ............................................. B01D 30/00
[52] U.S. Cl. ........................................ 203/10; 203/40; 203/41; 203/90; 202/182; 202/197; 202/200; 202/236
[58] Field of Search ................. 55/74, 80, 83, 97, 267, 55/338, 340, 421, 466, 482; 203/39, 41, 40, 90, 10; 202/182, 236, 197, 200; 159/DIG. 27

[56] References Cited

U.S. PATENT DOCUMENTS

| | | | |
|---|---|---|---|
| 853,071 | 5/1907 | Duffy | 202/182 |
| 867,143 | 9/1909 | Laidlaw | 202/182 |
| 1,889,617 | 11/1932 | Truog | 203/41 |
| 2,975,069 | 3/1961 | Laguilharre | 202/182 |
| 3,252,270 | 5/1966 | Pall | 55/74 |
| 3,288,685 | 11/1966 | Kemper | 202/182 |
| 3,342,703 | 9/1967 | Leach | 203/90 |
| 3,483,091 | 12/1969 | Metzger | 202/182 |
| 3,871,180 | 3/1975 | Swanson | 203/90 |

FOREIGN PATENT DOCUMENTS 1186262  4/1970  United Kingdom ................. 203/41

OTHER PUBLICATIONS

Hawley, The Condensed Chemical Dictionary, Van Nostrand, N.Y., 1971, 784.

Primary Examiner—Ernest G. Therkorn
Attorney, Agent, or Firm—Edmond T. Patnaude

[57] ABSTRACT

An aqueous saline vapor is passed through a porous mass having a temperature no less than that of the vapor and subsequently condensed to provide substantially salt-free water.

10 Claims, 5 Drawing Figures

DESALINATION SYSTEM

The present invention relates to the art of separating a solute from a liquid solvent in which it is dissolved, and it relates in particular to a new and improved method and apparatus wherein salt is removed from a saline solution by vaporizing the solution and then passing the vapor through a porous mass to remove salt from the vapor.

BACKGROUND OF THE INVENTION

There are many industrial processes which produce contaminated liquids, e.g., aqueous saline solutions which cannot be recycled or discharged directly into sewers or streams or otherwise returned directly to the environment. In some cases the contaminent is radioactive. Several different processes for removing salt contaminants from liquids are known and widely used in industry. The more common ones of these processes are reverse osmosis, high pressure distillation, and ion exchange. Although such systems are effective, the initial capital cost and/or the operating and maintenance costs of such systems are relatively high.

SUMMARY OF THE INVENTION

Briefly, there is provided in accordance with the present invention a new and improved process and apparatus for removing salts from saline liquid solutions by finely atomizing the saline solution to form a saline vapor and flowing the saline vapor through a porous, desalination element having a temperature no less than that of the vapor to prevent condensation either on the external or internal surfaces of the element. As the saline vapor passes through the pores of the element, the salt separates from the minute liquid particles of the aqueous carrier and remains on the upstream side of the porous element. Only vapor is drawn through the element, and subsequent condensation of the vapor which has passed through the element yields substantially salt-free water. The salinity of the vapor on the upstream side of the desalination element has been found to increase as the process is carried out. Eventually, the salinity increases to the level that crystallization of salt occurs upstream of the desalination element.

In one embodiment of the invention, the porous deslination element is a porous molded member made up of discrete silicon carbide particles which have been compressed together and fired at a temperature of 1800° F. or more. Silicon Carbide particles of 200 mesh size or finer will provide a porous desalination element functioning satisfactorily. However, other porous materials may be used, and the desalination element may be of any suitable shape such as a tube or plate-like disc. The element should be sufficiently thick relative to the flow rate of the vapor therethrough so that the vapor on the downstream side of the porous desalination element is substantially salt-free.

GENERAL DESCRIPTION OF THE DRAWING

The present invention will be better understood by a reading of the following detailed description taken in connection with the accompanying drawing wherein.

DETAILED DESCRIPTION OF A PREFERRED EMBODIMENT OF THE INVENTION

Figure 1:
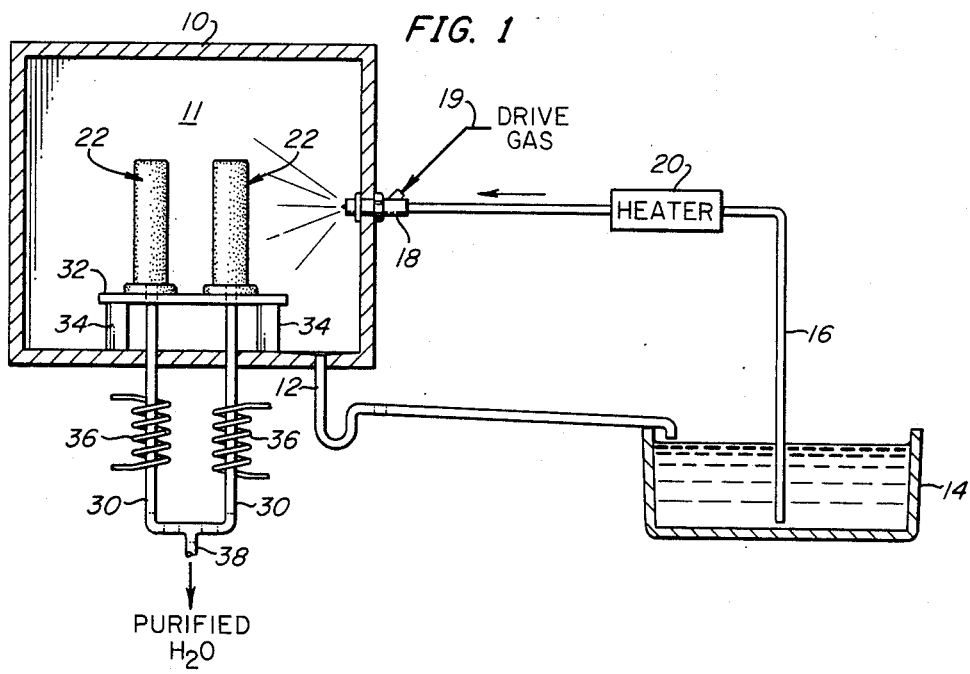
FIG. 1 is a schematic illustration of a system embodying the present invention for obtaining pure water from a saline aqueous solution, such as contaminated liquid waste.

Referring particularly to FIG. 1, there is shown an insulated enclosure or cabinet 10 having a desalination chamber 11 therein. A liquid drain 12 is provided at the bottom and is connected to a tank 14 containing a contaminated liquid to be purified. The contaminated liquid is a saline, aqueous solution, and a suction tube 16 extends from an atomizing device 18 to a location in the tank 14 below liquid level. The atomizing device 18 may be a conventional gas driven atomizing or fogging nozzle which sprays a fine mist or vapor of the saline solution into the chamber 11 to form a gas dispersion of the saline aqueous molecules. The atomizing device 18 is thus connected to a source of a high pressure gas, such as air, by a supply hose 19. The chamber 11 will thus be filled with a saline fog or vapor of very fine saline liquid particles or globules. Preferably, the humidity in the chamber 11 is one-hundred percent, and the temperature within the enclosure 10 is preferably above room temperature but must be less than the boiling point of the contaminated liquid. If the temperature of the liquid in the tank 14 is at about room temperature or less, a heater 20 may be connected in the line 16 to raise the temperature of the liquid supplied to the atomizing device to the desired elevated temperature for more efficient operation of the system.

Mounted within the enclosure 10 is one or more porous desalination elements 22. The elements may be of any suitable configuration, but in this particular embodiment of the invention the elements are rigid, ceramic-like tubes formed of a porous material such for example, as sintered carbide or sintered silicate. As shown best in FIG. 2, each of the elements 22 includes a hollow, cylindrical tube 24 having an integral end wall 25 at the top and an external, annular mounting flange 27 at the bottom. A circular bottom cover member 29 is sealably connected into the bottom of the cylinder 24. An outlet conduit 30 extends through the cover 29 and communicates with the interior of the tube 24.

The desalination elements 22 are affixed to a mounting plate 32 which is supported above the bottom wall of the enclosure 10 on a plurality of legs 34 to provide a space between the bottoms of the elements 22 and the bottom of the chamber 11. The mounting plate 32 is preferably perforate to permit vapor and liquid to pass freely therethrough.

The outlet conduits 30 from the respective tubes 24 extend through the wall of the enclosure 10 and before being connected to a purified water outlet 38 pass through cooling coils 36 located outside of the enclosure 10. Where practical to do so, the conduits 30 may be connected together upstream of the cooling coils 36. Means other than the coils 36 may be used for condensing the vapor which has passed through the elements 22.

When the humidity within the chamber 11 is at or near one hundred percent, and the temperature of the elements 22 and the vapor in the chamber 11 is above normal room temperature, the condensation of the vapor in the lines 30 on the downstream sides of the elements 22 creates a vacuum which draws the vapor from the chamber 11 through the passageways of the elements 22 to continuously produce substantially salt-free water as long as aqueous vapor is supplied to the chamber 11. As the process is continued the salinity of the vapor in the chamber increases until the saturation point is increased. Thereafter, crystallization of the salt occurs as the process is continued and salt is removed from the vapor as it passes through the desalination element. Some salt is thus deposited on the exterior surfaces of the elements 22 as well as on the walls of the chamber 11. Also, some of the saline fog condenses within the chamber and is returned to the tank 14 via the drain 12.

The mechanism by which the salt is separated from the aqueous particles is not fully understood. If a saline liquid solution is passed in the liquid state through the elements 22 none of the salt is removed from the solution. Since the elements 22 have the same temperature as the fog or vapor, there is no appreciable condensation on the surfaces of the elements 22 nor is any appreciable amount of salt deposited within the elements. Rather, purified aqueous vapor flows from the downstream sides of the elements 22 and the salinity of the vapor remaining in the chamber 11 on the upstream side of the elements gradually increases. Since there is only a small salt deposit of between about five and ten percent within the element itself, which does not increase as the process continues, we believe that the water molecules in the saline vapor evaporate as a result of partial pressure evaporation within the pores of the element as the vapor passes therethrough, and the thus concentrated saline particles are dissolved in the unevaporated saline water particles and move upstream of the element.

Figures 2, 3:
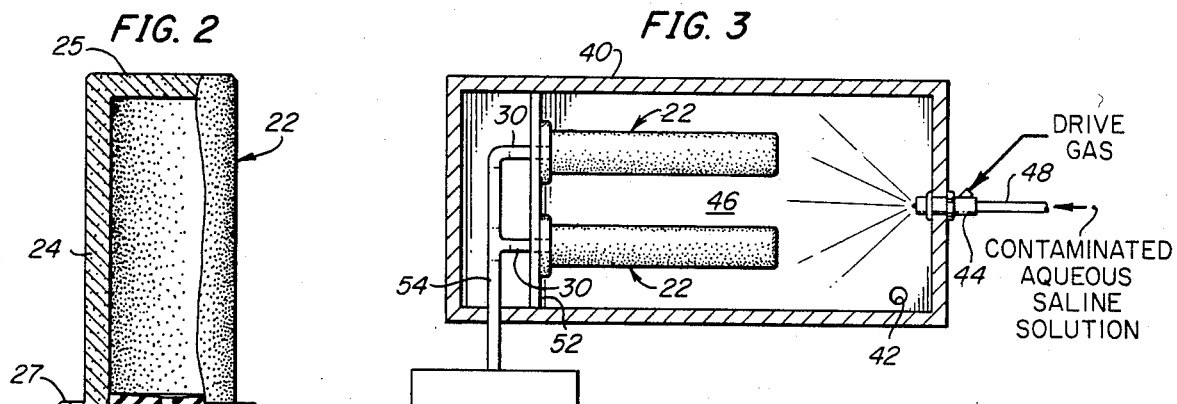
FIG. 2 is a view, partly in cross-section, of a porous tube suitable for use in carrying out the present invention.
FIG. 3 is a horizontal, cross-sectional view of another embodiment of the invention.

Referring to FIG. 3, there is shown another embodiment of the invention. It comprises an insulated enclosure 40 having a liquid drain 42 at the bottom and an atomizing nozzle or other fogging or vaporizing device 44 opening into the chamber 46. The contaminated saline solution from which purified water is to be extracted is connected by a line 48 to the atomizing device 44. A plurality of the tubular porous desalination elements 22 are mounted in horizontal, parallel, side-by-side relationship to a vertical partition 52 extending across the chamber 46, and the outlet conduits 30 are connected to a common manifold tube 54 which extends through the enclosure 40 to a condenser 56 located outside of the enclosure.

Figures 4, 5:
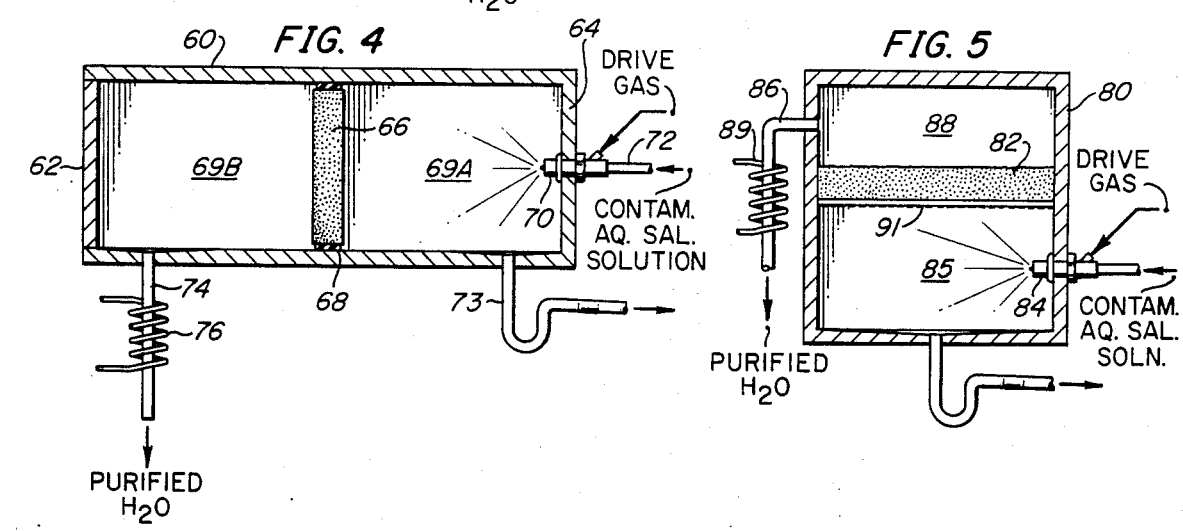
FIG. 4 is a vertical, cross-sectional view of still another embodiment of the invention.
FIG. 5 is a vertical cross-sectional view of still another embodiment of the invention.

Referring to FIG. 4, a cylindrical tubular housing 60 is sealed at its respective ends by end walls 62 and 64, and a porous disc 66, which is hermetically sealed to the inner wall of the housing 60 by an annular sealing gasket 68 separates the space within the enclosure 60 into two chambers 69A and 69B. An atomizing device 70 is supplied with a saline contaminated, aqueous solution via a conduit 72, and a driving gas, such as air, is applied under pressure to the device 70. The atomizing device 70 is operated so that the chamber 69A to the right side of the disc 66 is filled with a saline fog. A drain line 73 extends from the bottom of the chamber 69A for returning the saline solution which condenses in the chamber 69A to the source of the contaminated liquid.

An outlet conduit 74 is connected to the chamber 69B at the left side of the porous disc 66 and passes through a cooling coil 76 or may connect to any other suitable condenser. The vapor in the conduit 74 in the vicinity of the coil 76 is condensed and reduces the pressure in the conduit 74, wherefor more vapor is drawn through the porous desalination element 66. As the minute saline water particles pass through the pores of the disc 66, the salt is separated from the water particles. While the chambers on both sides of the element 66 are filled with an aqueous fog or vapor, the vapor in the upstream chamber 69A is saline while that in the downstream chamber 69B is not.

Where it is desired to use a porous bed of fine particles such as activated carbon, diatomaceous earth, silicates or the like as the desalination element, a vessel 80 as shown in FIG. 5 may be used with a desalination element 82 extending across the chamber within the vessel. The solution to be purified is vaporized by means of an atomizing nozzle 84 to fill the lower chamber 85 with the vapor. An outlet conduit 86 extends from the upper chamber 88 through a cooling coil 89. The desalination element includes a perforated support member 91 on which a bed of finely divided particles is supported. Condensation of the purified vapor in the conduit 86 reduces the pressure within the chamber 88 whereby vapor is drawn from the chamber 85 through the porous bed.

The desalination element may be any porous material having a fine, irregular passageway passing therethrough to provide a high surface area to mass ratio. We have obtained good results, i.e., output water having a salinity no greater than common tap water having a resistivity in the order of 0.00385 megohm centimeter, by using a silicon carbide ceramic-like porous material wherein the the average pore diameter was 30 microns. The thickness of the desalination element was 10 millimeters and the external surface area was 0.0721 square meters. The face velocity through the element was 5.4 meters/hour and the pressure differential across the desalination element was less than 0.1 kiloPascal. The permeability was about 6700 milliDarcies.

One material which is suitable for use as the desalination element in carrying out the present inventon is a granular ceramic silicon carbide material manufactured by Schumaker-Fabric, A.G. of the West German Republic and distributed in the United States under the name Shumalith SC-20.

Tests were performed using several different salts, but the saline solution had a pH of about 9. The purified water obtained from the process of the present invention will have a a resistivity in the range of about 5000 to 15000 ohmcentimeters and a pH of about 7.

Many different porous materials may be used as the desalination element. Beds of activated charcoal particles have the advantage of removing colorants as well as salt from the solution being purified. An element formed of compacted plastic particles or of tightly wound fibrous filaments are particularly suited for use with toxic or radioactive materials because they can be burned after use making eventual disposal more economical.

The process of the present invention may be used to separate other solutes from solvents in which they are dissolved where the evaporation pressures of the solvent and solute are substantially different.

The required thickness of the desalination element will vary with the rate of flow of vapor therethrough, but must be sufficiently thick so that separation of the dissolved salt from the aqueous solvent occurs within the element and only the purified solvent vapor exits the downstream side of the element. We do not believe that any improvement in purity will occur if the thickness of the element is increased beyond the minimum required thickness.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. A method of removing a solid solute from a liquid solvent in which it is dissolved comprising the steps of forming a vapor from a solution of said solute and said solvent while maintaining the temperature of said solution below the boiling point of said solvent, and passing said vapor through a porous mass to separate said solute from said solvent.

2. A method of removing salt from an aqueous saline solution, comprising the steps of forming a saline vapor from said saline solution while maintaining the temperature of said solution below the boiling point of said solution, positioning a porous desalination material in said vapor, flowing said vapor through said material and subsequently condensing the vapor drawn through said material, whereby salt is removed from said saline vapor as it passes through said material.

3. A method according to claim 2 wherein said step of forming a saline vapor is carried out by atomizing said saline solution.

4. A method according to claim 3 comprising the steps of locating said porous desalination element within a chamber containing said saline vapor with one side of said material directly exposed to said vapor, and connecting the other side of said element to a condenser.

5. A method according to claim 4 wherein said step of flowing said saline vapor through said porous desalination material is carried out by reducing the pressure on said other side of said material.

6. A method according to claim 2 wherein the temperature of said element is maintained sufficiently high to prevent condensation of said vapor in said element.

7. Desalination apparatus comprising an enclosure having a chamber therein, atomizer means mounted in said chamber and connected to a source of salt water for filling said chamber with a saline aqueous vapor, porous desalination means mounted in said chamber with one side of said element exposed to the vapor in said chamber, said desalination means comprising a rigid porous mass of sintered particles selected from the group consisting of carbides and silicates, a condenser, and means connecting the other side of said element to said condenser, whereby vapor from said chamber is drawn through said element and salt is removed from the vapor as it passes through said element.

8. Desalination apparatus according to claim 7 wherein said porous desalination means comprises a plurality of porous tubular elements.

9. Desalination apparatus according to claim 7 wherein said desalination element is generally planar.

10. Disalination apparatus according to claim 7 wherein said particles have a size of 200 mesh or finer.

* * * * *